(12) United States Patent
Kava et al.

(10) Patent No.: US 9,878,703 B2
(45) Date of Patent: Jan. 30, 2018

(54) ELECTRIFIED VEHICLE WITH POWER DISSIPATION FEATURE

(71) Applicant: FORD GLOBAL TECHNOLOGIES, INC., Dearborn, MI (US)

(72) Inventors: Chris Michael Kava, Taylor, MI (US); Kent Hancock, Ann Arbor, MI (US); Angel Fernando Porras, Dearborn, MI (US); Mark Anthony Rockwell, Wyandotte, MI (US); Justin Reuel Badger, Plymouth, MI (US); Brett Allen Dunn, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/064,039

(22) Filed: Mar. 8, 2016

(65) Prior Publication Data

US 2017/0259806 A1 Sep. 14, 2017

(51) Int. Cl.
| | |
|---|---|
| *B60L 9/00* | (2006.01) |
| *B60W 20/14* | (2016.01) |
| *B60K 6/365* | (2007.10) |
| *B60K 6/48* | (2007.10) |
| *B60L 7/10* | (2006.01) |
| *B60L 11/18* | (2006.01) |

(52) U.S. Cl.
CPC ............ *B60W 20/14* (2016.01); *B60K 6/365* (2013.01); *B60K 6/48* (2013.01); *B60L 7/10* (2013.01); *B60L 11/1874* (2013.01); *B60L 11/1875* (2013.01); *B60K 2006/4808* (2013.01); *B60K 2006/4825* (2013.01); *B60K 2006/4833* (2013.01); *B60W 2510/246* (2013.01); *B60W 2710/246* (2013.01); *B60Y 2200/92* (2013.01); *B60Y 2300/18125* (2013.01); *B60Y 2300/91* (2013.01); *B60Y 2300/92* (2013.01); *B60Y 2306/05* (2013.01); *B60Y 2400/112* (2013.01); *B60Y 2400/81* (2013.01); *Y10S 903/91* (2013.01)

(58) Field of Classification Search
USPC ............................................................ 701/22
See application file for complete search history.

(56) References Cited

U.S. PATENT DOCUMENTS

| | | |
|---|---|---|
| 5,291,960 A | 3/1994 | Brandenburg et al. |
| 6,488,345 B1 | 12/2002 | Woody et al. |
| 7,260,947 B1 | 8/2007 | Harrison |
| 7,420,339 B2 | 9/2008 | Chung et al. |
| 8,393,551 B2 | 3/2013 | Nemesh et al. |
| 8,630,759 B2 | 1/2014 | Bauerle |
| 8,634,939 B2 | 1/2014 | Martin et al. |

(Continued)

FOREIGN PATENT DOCUMENTS

| | | |
|---|---|---|
| EP | 2020315 B1 | 8/2011 |
| GB | 1120118 A | 7/1968 |

(Continued)

*Primary Examiner* — Tyler D Paige
(74) *Attorney, Agent, or Firm* — Carlson, Gaskey & Olds, P.C.

(57) ABSTRACT

An electrified vehicle according to an exemplary aspect of the present disclosure includes, among other things, an energy recovery mechanism, and a controller configured to selectively activate at least a battery cooling mode to dissipate excess power from the energy recovery mechanism.

14 Claims, 4 Drawing Sheets

(56) References Cited

U.S. PATENT DOCUMENTS

| | | | |
|---|---|---|---|
| 8,816,530 B2 | 8/2014 | Callicoat et al. | |
| 8,869,923 B2 | 10/2014 | Osara et al. | |
| 2007/0144804 A1* | 6/2007 | Pike | B60L 11/1874 180/170 |
| 2008/0276913 A1 | 11/2008 | Zubeck | |
| 2009/0139781 A1* | 6/2009 | Straubel | B60L 11/1875 180/65.1 |
| 2010/0019718 A1* | 1/2010 | Salasoo | B60L 3/0046 320/103 |
| 2010/0072954 A1* | 3/2010 | Kohn | H02J 7/0091 320/152 |
| 2010/0079115 A1* | 4/2010 | Lubawy | B60L 7/10 320/150 |
| 2011/0174561 A1* | 7/2011 | Bowman | B60K 6/46 180/65.245 |
| 2013/0268182 A1 | 10/2013 | Treharne et al. | |
| 2017/0106725 A1* | 4/2017 | Kim | B60H 1/00392 |

FOREIGN PATENT DOCUMENTS

| | | | |
|---|---|---|---|
| JP | 3687429 B2 | 8/2005 | |
| JP | 2012001168 A | 1/2012 | |
| WO | 9421481 A1 | 9/1994 | |
| WO | 2008147305 A1 | 12/2008 | |

\* cited by examiner

ELECTRIFIED VEHICLE WITH POWER DISSIPATION FEATURE

TECHNICAL FIELD

This disclosure relates to dissipating power within an electrified vehicle and, more particularly, to dissipating power by selectively activating at least one of a battery cooling mode and a battery heating mode.

BACKGROUND

Generally, electrified vehicles are selectively driven using one or more battery-powered electric machines. Electric machines can drive electrified vehicles instead of, or in addition to, an internal combustion engine. Example electrified vehicles include all-electric vehicles, hybrid electric vehicles (HEVs), plug-in hybrid electric vehicles (PHEVs), fuel cell vehicles, and battery electric vehicles (BEVs).

Some electrified vehicles use energy recovery mechanisms, such as regenerative braking systems, to recover energy. The recovered energy is typically stored within a battery until the energy is used to power the electric machines. In some situations, the battery may be unable to store all the recovered energy. For example, the battery may be fully charged, or the temperature of the battery may be too high.

SUMMARY

An electrified vehicle according to an exemplary aspect of the present disclosure includes, among other things, an energy recovery mechanism, and a controller configured to selectively activate at least a battery cooling mode to dissipate excess power from the energy recovery mechanism.

In a further non-limiting embodiment of the foregoing electrified vehicle, the controller is further configured to selectively active at least one of a battery cooling mode and a battery heating mode to dissipate excess power from the energy recovery mechanism.

In a further non-limiting embodiment of any of the foregoing electrified vehicles, the vehicle further comprises a vehicle battery, and the controller selectively activates at least one of the battery cooling mode and the battery heating mode in response to a temperature of the vehicle battery.

In a further non-limiting embodiment of any of the foregoing electrified vehicles, the controller activates the battery cooling mode if the temperature of the vehicle battery is above a threshold temperature, and the controller activates at least the battery heating mode if the temperature of the vehicle battery is below the threshold temperature.

In a further non-limiting embodiment of any of the foregoing electrified vehicles, the controller simultaneously activates both the battery cooling mode and the battery heating mode if the battery heating mode alone cannot dissipate the excess power.

In a further non-limiting embodiment of any of the foregoing electrified vehicles, the controller simultaneously activates both the battery cooling mode and the battery heating mode only if the vehicle battery is below the threshold temperature.

In a further non-limiting embodiment of any of the foregoing electrified vehicles, the vehicle includes a battery cooling loop having a coolant pump configured to circulate cooling fluid to cool a vehicle battery, and the controller is configured to activate the battery cooling mode by directing excess power to at least one of the coolant pump and an air conditioning compressor.

In a further non-limiting embodiment of any of the foregoing electrified vehicles, the vehicle includes a battery heating loop having a heater adjacent a vehicle battery, and the controller is configured to activate the battery heating mode by directing excess power to the heater.

In a further non-limiting embodiment of any of the foregoing electrified vehicles, the heater is an induction heater.

In a further non-limiting embodiment of any of the foregoing electrified vehicles, the vehicle further comprises a vehicle battery, and the controller selectively directs power from the energy recovery mechanism to the vehicle battery until the vehicle battery is fully charged. Further, the excess power from the energy recovery mechanism is power in excess of what is required to fully charge the vehicle battery.

In a further non-limiting embodiment of any of the foregoing electrified vehicles, the energy recovery mechanism is a regenerative braking system that selectively resists rotation of at least one wheel of the electrified vehicle.

In a further non-limiting embodiment of any of the foregoing electrified vehicles, the electrified vehicle is a hybrid electric vehicle.

An electrified vehicle according to another exemplary aspect of the present disclosure includes, among other things, an energy recovery mechanism, and a controller configured to selectively activate a battery cooling mode and a battery heating mode simultaneously to dissipate excess power from the energy recovery mechanism.

In a further non-limiting embodiment of the foregoing electrified vehicle, the vehicle further comprises a vehicle battery, and the controller selectively activates the battery cooling mode and the battery heating mode in response to a temperature of the vehicle battery.

In a further non-limiting embodiment of any of the foregoing electrified vehicles, the controller simultaneously activates both the battery cooling mode and the battery heating mode if the vehicle battery is below a threshold temperature and the battery heating mode alone cannot dissipate the excess power.

In a further non-limiting embodiment of any of the foregoing electrified vehicles, the vehicle includes a battery cooling loop having a coolant pump configured to circulate cooling fluid to cool a vehicle battery, and the controller is configured to activate the battery cooling mode by directing excess power to the coolant pump.

In a further non-limiting embodiment of any of the foregoing electrified vehicles, the vehicle includes a battery heating loop having a heater adjacent a vehicle battery, and the controller is configured to activate the battery heating mode by directing excess power to the heater.

A method of dissipating power within an electrified vehicle according to an exemplary aspect of the present disclosure includes, among other things, generating excess power from an energy recovery mechanism, and activating at least a battery cooling mode to dissipate the excess power.

In a further non-limiting embodiment of the foregoing method, the method includes activating at least one of a battery cooling mode and a battery heating mode to dissipate excess power from the energy recovery mechanism in response to a temperature of a vehicle battery.

In a further non-limiting embodiment of any of the foregoing methods, the method further includes simultaneously activating both the battery cooling mode and the battery heating mode if the battery heating mode alone cannot dissipate the excess power.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

This disclosure relates to dissipating power within an electrified vehicle. More particularly, this disclosure relates to dissipating power by selectively activating at least one of a battery cooling mode and a battery heating mode. In one example, the dissipated power is generated by an energy recovery mechanism, such as a regenerative braking system.

Figure 1:
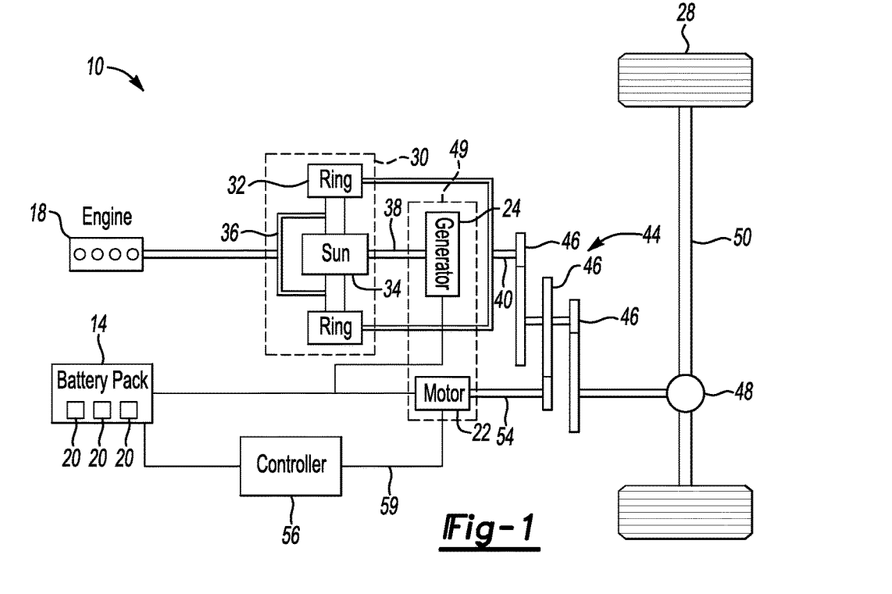
FIG. 1 schematically illustrates an example powertrain for an electrified vehicle.
Figure 2:
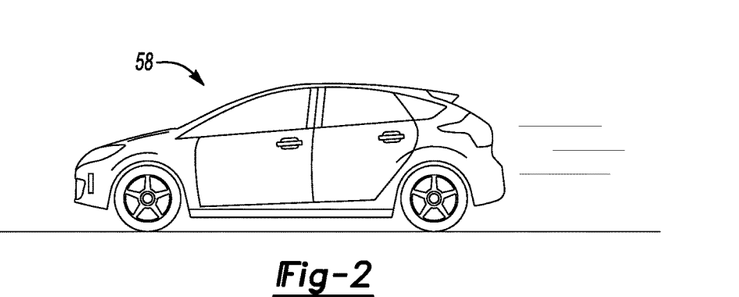
FIG. 2 illustrates an electrified vehicle traveling on level ground.

FIG. 1 schematically illustrates a powertrain 10 for a hybrid electric vehicle (HEV), such as the vehicle 58 (FIG. 2). The powertrain 10 may be referred to as a hybrid transmission in some examples. A battery pack 14 and an internal combustion engine 18 selectively operate with the powertrain 10. The battery pack 14 includes arrays 20 of rechargeable battery cells. In this disclosure, any reference to the battery pack 14 also includes, where appropriate, the arrays 20 of battery cells. The powertrain 10 includes a motor 22 and a generator 24, both of which are types of electric machines. The motor 22 and generator 24 may be separate or may have the form of a combined motor-generator.

In this embodiment, the powertrain 10 is a power-split transmission that employs a first drive system and a second drive system. The first and second drive systems generate torque to drive one or more sets of vehicle drive wheels 28. The first drive system includes a combination of the engine 18 and the generator 24. The second drive system includes at least the motor 22, the generator 24, and the battery pack 14. The motor 22 and the generator 24 are portions of an electric drive system of the powertrain 10.

The engine 18 and the generator 24 may be connected through a power transfer unit 30, such as a planetary gear set. Other types of power transfer units, including other gear sets and transmissions, can be used to connect the engine 18 to the generator 24. In one non-limiting embodiment, the power transfer unit 30 is a planetary gear set that includes a ring gear 32, a sun gear 34, and a carrier assembly 36.

The generator 24 can be driven by the engine 18 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 18, for example, to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28. The motor 22 can be selectively employed to drive the vehicle drive wheels 28 by outputting torque to a shaft 54 that is also connected to the second power transfer unit 44.

Further, in this embodiment, the motor 22 and the generator 24 cooperate as part of an energy recovery mechanism 49, which in this example is a regenerative braking system, in which both the motor 22 and the generator 24 can be employed as motors to output torque. For example, the motor 22 and the generator 24 can each output electrical power to recharge cells of the battery pack 14. As discussed below, the power generated by the regenerative braking system may be dissipated by the vehicle 58 in other ways.

The powertrain 10 may additionally include a controller 56 for monitoring and/or controlling various aspects of the powertrain 10 and associated vehicle 58. For example, the controller 56 may communicate with the electric drive system, the power transfer units 30, 44, and/or other components to monitor various vehicle 58 conditions, control the vehicle 58, or both. The controller 56 includes electronics, software, or both, to perform the necessary control functions for operating the vehicle 58.

In one non-limiting embodiment, the controller 56 is a combination vehicle system controller and powertrain control module (VSC/PCM). Although it is shown as a single device, the controller 56 may include multiple controllers in the form of multiple hardware devices, or multiple software controllers within one or more hardware devices. A controller area network (CAN) 59 allows the controller 56 to communicate with the various components of the vehicle 58.

The example vehicle 58 is a hybrid-electric vehicle having a powertrain, such as the powertrain 10. In other examples, the vehicle could be an all-electric vehicle incorporating a regenerative braking system. In still other examples, the vehicle could be a vehicle incorporating an energy recovery mechanism other than a regenerative braking system.

As mentioned above, the motor 22 and the generator 24 cooperate as part of a regenerative braking system. The regenerative braking system, again, is a type of energy recovery mechanism 49. The regenerative braking system can be used to reduce, or maintain, the speed of the vehicle, while recovering energy and generating power for use by the vehicle 58.

Typically, the energy recovered by the regenerative braking system is stored in the battery pack 14. Under some conditions, however, the battery pack 14 cannot store all the energy from the regenerative braking system. In those conditions, the example vehicle 58 dissipates excess power from the regenerative braking system by directing the excess power to auxiliary loads. For purposes of this disclosure, "excess power" is power generated by the energy recovery mechanism 49 that cannot be stored as energy by the battery pack 14 for some reason, including, for example, that the battery pack 14 is fully charged, the excess power rate is greater than the battery charge limit, or the battery is operating at too high a temperature. Dissipating this excess power increases the usability of the regenerative braking system and reduces (if not eliminates) the need to use friction brakes or the engine 18 to maintain or decrease a vehicle speed, which, in turn, reduces wear on the friction brakes and prevents excess thermal energy build-up.

Examples conditions that require power dissipation can include the vehicle 58 moving down a grade in a grade descent assist mode, the vehicle 58 requiring speed control moving down a grade, the vehicle 58 operating in a low gear when descending a grade, the vehicle 58 coasting or decelerating from a relatively high speed (even on relatively level ground), or the vehicle 58 maximizing its speed when descending a grade.

Referring now to FIGS. 2-5, and with continuing reference to FIG. 1, when the vehicle 58 is on relatively level ground (such as in FIGS. 2 and 3), the battery pack 14, the engine 18, or both can apply a positive torque to the wheels 28 through the powertrain 10. The positive torque moves the vehicle 58 forward, and is needed to maintain a speed of the vehicle 58.

Figure 3:
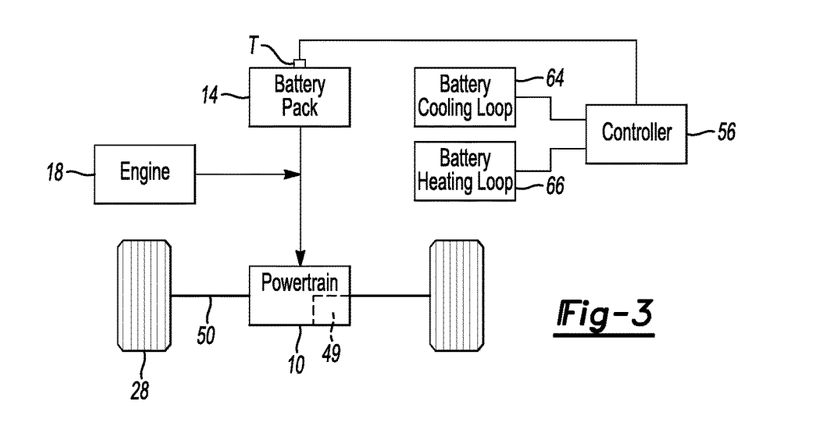
FIG. 3 schematically illustrates an example energy distribution when the electrified vehicle is in the position of FIG. 2.

Two auxiliary loads are illustrated in FIG. 3. The auxiliary loads include a battery cooling loop 64 and a battery heating loop 66. Under the conditions of FIG. 2, however, the vehicle 58 is not required to dissipate excess power, and thus the battery cooling and heating loops 64, 66 are not activated.

Figure 4:
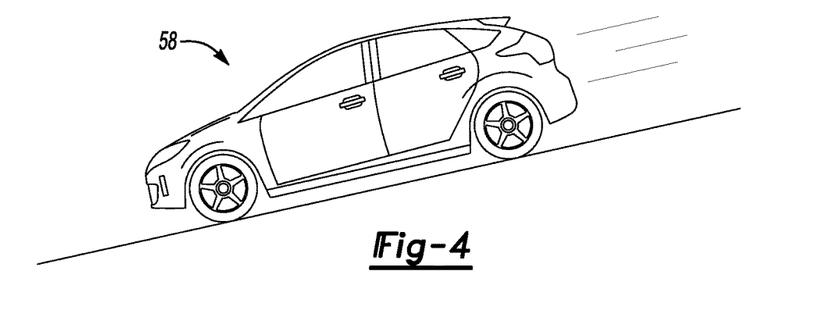
FIG. 4 illustrates an electrified vehicle descending a grade.
Figure 5:
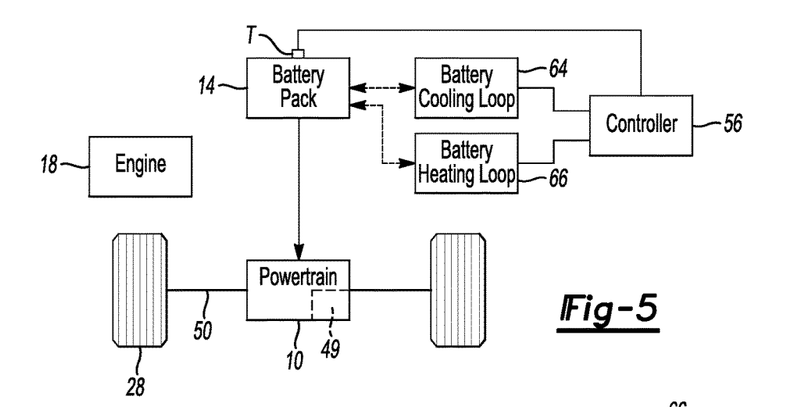
FIG. 5 schematically illustrates an example energy distribution when the electrified vehicle is in the position of FIG. 4.

FIGS. 4 and 5 illustrate the vehicle 58 in a condition where dissipation of excess power is required. In FIG. 4, the vehicle 58 is descending a grade. However, this disclosure is not limited to power dissipation during a descent, and is inclusive of other conditions where dissipation of excess power is required.

In FIGS. 4 and 5, the regenerative braking system is used to apply a negative torque to the wheels 28 to maintain a speed or to limit acceleration of the vehicle 58 down the grade, for example. The negative wheel torque is needed to maintain a speed of the vehicle 58, or slow the vehicle 58, when descending the grade. Depending on the steepness of the grade, the vehicle 58 applies a proportional level of negative torque. The applied level of negative torque is proportional to the power generated by the regenerative braking system.

In the example of FIGS. 4 and 5, the negative torque request is relatively large, and causes the regenerative braking system to generate excess power. The excess power, in this example, is dissipated by the vehicle 58 by activating at least one auxiliary load. In this example, the auxiliary loads include the battery cooling and heating loops 64, 66, which are in communication with the controller 56, and are configured to cool and heat the battery pack 14 in a "battery cooling mode" and "battery heating mode," respectively. The dashed lines in FIG. 5 indicate, schematically, that at least one of the battery cooling and heating loops 64, 66 is activated.

The controller 56 is also in communication with one or more temperature sensors T configured to generate a signal indicative of the temperature of the battery pack 14. The controller 56 is further operable to receive inputs such as vehicle speed, driver acceleration/deceleration requests, driver operating mode (drive low gear, cruise control, other), ambient temperature outside the vehicle 58, passenger cabin temperature, passenger climate setting, and battery pack 14 state of charge, among others.

The controller 56 is configured to selectively activate at least one of the battery cooling and heating modes by directing excess power to a corresponding battery cooling and/or heating loops 64, 66. The controller 56 is also configured to direct the excess power to additional auxiliary loads to dissipate excess power, including, for example, pumps, valves, engine fans, grille shutters, heated backlights, and high beam headlights.

Figure 6:
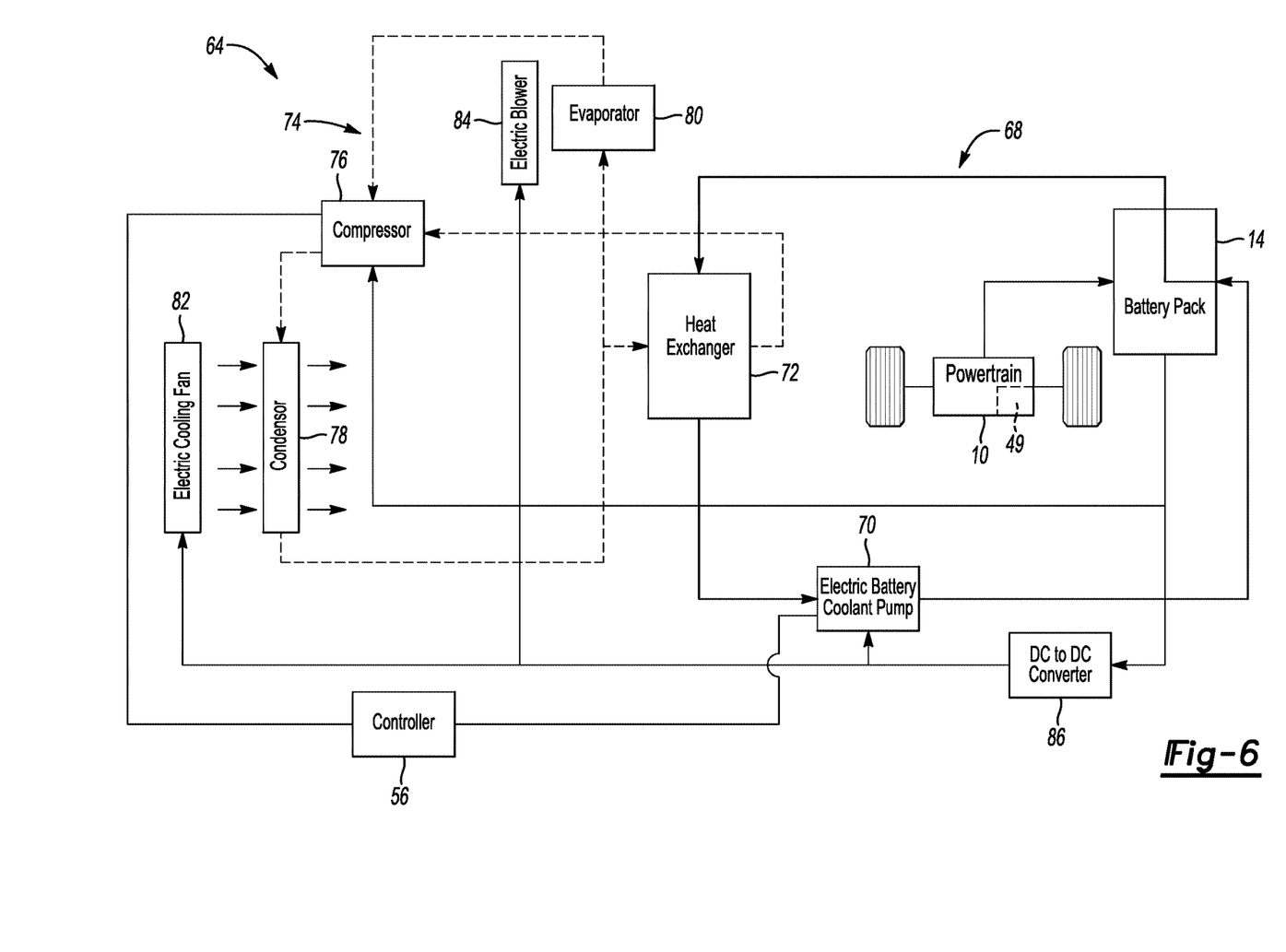
FIG. 6 schematically illustrates an example battery cooling loop.

FIG. 6 schematically illustrates an example battery cooling loop 64 in detail. In FIG. 6, the battery pack 14 is fluidly coupled to a first cooling circuit 68 (shown with relatively bold lines). The first cooling circuit 68 includes an electric battery coolant pump 70 fluidly coupled to the battery pack 14. The electric battery coolant pump 70 is configured to pressurize a flow of cooling fluid and direct that cooling fluid to the battery pack 14. The cooling fluid is configured to absorb heat from the battery pack 14, and may be configured to flow within, or around, the battery pack 14. The battery pack 14 could include one or more cooling paths therein, including passageways provided by one or more conduits.

Downstream of the battery pack 14, the cooling fluid is directed to a heat exchanger 72. The heat exchanger 72 is a chiller in one example. The heat exchanger 72 interacts with a second cooling circuit 74 to cool the cooling fluid in the first cooling circuit 68. Finally, the heat exchanger 72 is fluidly coupled to the electric battery coolant pump 70.

In this example, the second cooling circuit 74 (shown with dashed lines) is provided, at least in part, by the air conditioning system of the vehicle 58. The second cooling circuit 74 includes a compressor 76 configured to pressurize a cooling fluid and direct that cooling fluid to a condenser 78. The condenser 78 is fluidly coupled, in parallel, to the heat exchanger 72 and an evaporator 80. In this example, the condenser 78 cooperates with an electric cooling fan 82, and the evaporator 80 cooperates with an electric blower 84. Finally, the heat exchanger 72 and the evaporator 80 are fluidly coupled to the compressor 76, either by separate inlets or a common inlet to the compressor 76.

In one example, the electric battery coolant pump 70, the compressor 76, the electric cooling fan 82, the electric blower 84, and any valves (if present) receive power from the energy recovery mechanism 49 via a DC-to-DC converter 86. The DC-to-DC converter 86 is used to step high voltage direct current from the energy recovery mechanism 49 or from a high voltage bus, if present, down to a 12 volt level, for example, to power the accessories in the vehicle 58. While in FIG. 6 the compressor 76 is electrically coupled to the DC-to-DC converter 86, the compressor 76 could be coupled directly to an HV bus directly in some examples.

In order to activate the battery cooling mode, the controller 56 directs excess power generated from the energy recovery mechanism 49 to one or both of the electric battery coolant pump 70 and the compressor 76, for example. When activated, the second cooling circuit 74 is configured to absorb heat from the cooling fluid within the first coolant circuit 68 at the heat exchanger 72. The cooling fluid in the first coolant circuit 68, in turn, absorbs heat from the battery pack 14, and therefor cools the battery back 14 to prevent the battery pack 14 from overheating. In some examples, even when operating at a relatively mild temperature, the battery cooling mode could be activated to further cool the battery pack 14 and dissipate excess energy.

Figure 7:
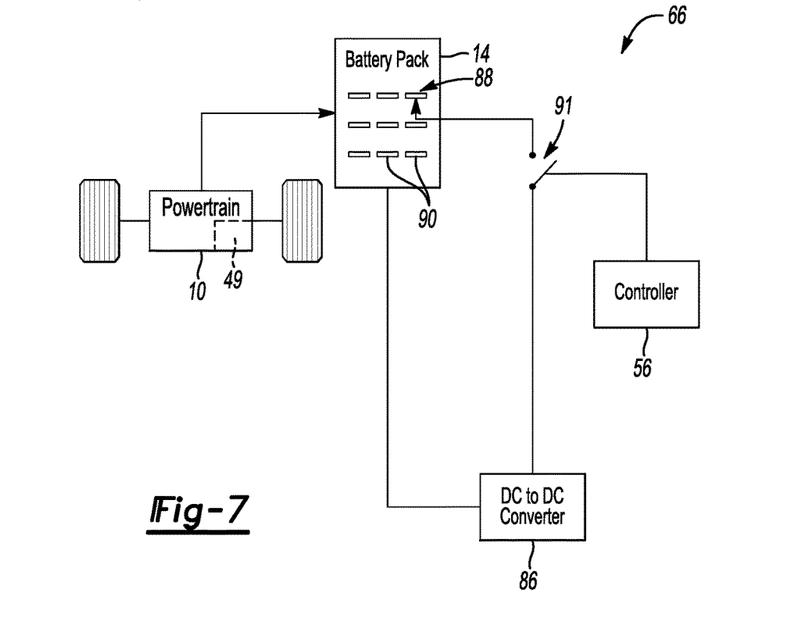
FIG. 7 schematically illustrates an example battery heating loop.

FIG. 7 schematically illustrates an example battery heating loop 66 in detail. In the example of FIG. 7, a heater 88 is provided adjacent the battery pack 14. In one example, the heater 88 is mounted to an exterior housing of the battery pack 14. Alternatively, the heater 88 could be incorporated into the battery pack 14 itself. Further, the heater 88 could be used to heat fluid, such as a coolant (e.g., a 50/50 glycol-water mix), and that relatively higher temperature fluid can then be used to heat the battery pack 14.

In one example, the heater 88 includes at least one induction heater 90. In FIG. 7, a plurality of induction heaters 90 are provided adjacent the battery pack 14. While induction heaters are illustrated, the heater 88 could be another type of heater, such as another type of electric heater.

The controller 56 is configured to selectively activate the battery heating mode by directing excess power to the heater 88. In one example, the controller 56 is configured to selectively open and close a switch 91 provided between the DC-to-DC converter 86 and the induction heaters 90. The battery heating mode is particularly useful in cold temperature conditions, where raising the temperature of the battery pack 14 increases its efficiency.

Figure 8:
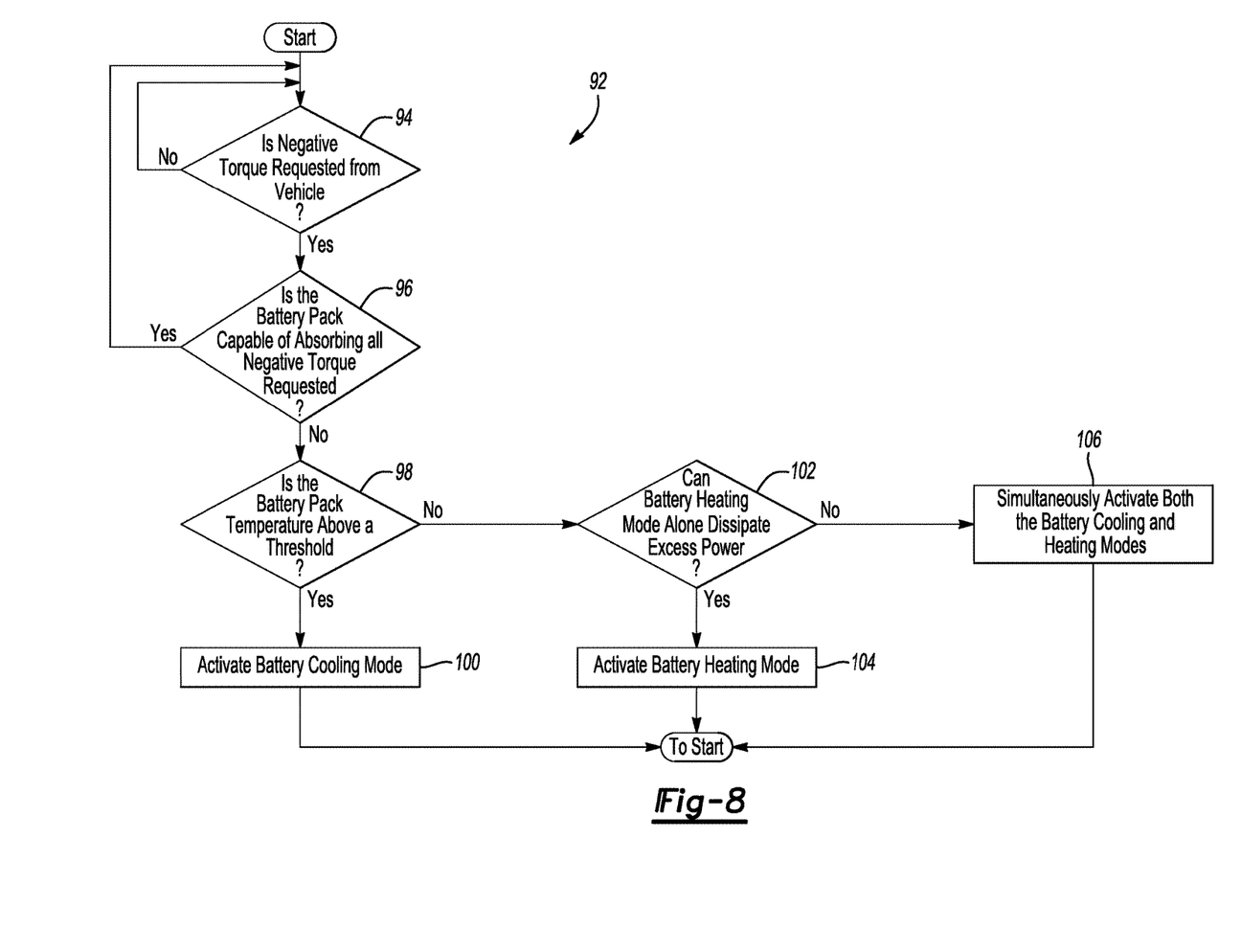
FIG. 8 is a flow chart representing an example method of dissipating power.

FIG. 8 is a flow chart representing an example method 92 of dissipating excess power. In the method 92, the controller 56, for example, first determines whether negative torque is requested from the vehicle 58, at 94. A negative torque request may be indicated, for example, by the travel of a brake pedal or by the vehicle being in cruise control. Further, and again, the negative torque request may occur when the vehicle is descending down a grade, such as in the example FIGS. 4-5.

If negative torque is requested, the controller 56 then determines, at 96, whether the battery pack 14 is capable of absorbing the energy expected to be created from the request. If the battery pack 14 is capable of absorbing the entire request, the controller 56 directs the energy to the battery pack 14 for storage. If not, however, the controller 56 then determines whether the battery pack 14 temperature is above a predetermined threshold temperature, at 98. The controller 56, in one example, compares the temperature indicated by the temperature sensor T against a predetermined threshold temperature.

If the battery pack temperature is above the predetermined threshold, at 98, then the controller 56 activates the battery cooling mode, at 100. In one example, the controller 56 activates the battery cooling mode by sending appropriate signals to the battery cooling loop 64, including, for example, directing excess power to one or more of the electric battery coolant pump 70 and the compressor 76.

If, at 98, the battery pack temperature is not above the predetermined threshold, the controller 56 then determines, at 102, whether activating the battery heating mode alone would dissipate the expected amount of excess power. If so, the controller 56 activates the battery heating mode, at 104, by sending appropriate signals to the battery heating loop 66, including, for example, closing the switch 91 and thereby directing excess power to the heater 88.

If, at 102, the controller 56 determines that activating the battery heating mode alone will not dissipate all expected excess power, the controller 56, at 106, simultaneously activates both the battery cooling and heating modes. Simultaneously activating both the battery cooling and modes increases the level of power dissipation, which allows for prolonged regenerative braking even when faced with a relatively large amount of excess power. Simultaneously activating both the battery cooling and heating modes is, in some examples, only necessary temporarily to dissipate a large amount of excess power, such as when the vehicle 58 descends down a relatively steep portion of a hill.

In the example method 92, the battery cooling and heating modes are only activated simultaneously when the temperature of the battery pack 14 is below the threshold temperature. However, in some examples, the battery cooling and heating modes could both be activated when the battery pack is above the threshold temperature.

This disclosure provides for improvements relative to temperature management of the battery pack 14, which leads to improved battery life and better battery capabilities. This disclosure also provides an increased availability of regenerative braking, which improves vehicle safety by lessening the degradation of the vehicle's friction brakes and provides for fewer occurrences of the vehicle speeding up when traveling downhill. Further, this disclosure also decreases vehicle emissions, reduces engine noise, and results in less wear on the engine due to more engine off time and reduced engine speeds.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   an energy recovery mechanism; and
   a controller configured to simultaneously activate both a battery cooling mode and a battery heating mode to dissipate excess power from the energy recovery mechanism.

2. The electrified vehicle as recited in claim 1, further comprising a vehicle battery.

3. The electrified vehicle as recited in claim 2, wherein the controller simultaneously activates both the battery cooling mode and the battery heating mode only if the vehicle battery is below a threshold temperature.

4. The electrified vehicle as recited in claim 1, wherein:
   the vehicle includes a battery cooling loop having a coolant pump configured to circulate cooling fluid to cool a vehicle battery, and
   the controller is configured to activate the battery cooling mode by directing excess power to at least one of the coolant pump and an air conditioning compressor.

5. The electrified vehicle as recited in claim 4, wherein:
   the vehicle includes a battery heating loop having a heater adjacent a vehicle battery, and
   the controller is configured to activate the battery heating mode by directing excess power to the heater.

6. The electrified vehicle as recited in claim 5, wherein the heater is an induction heater.

7. The electrified vehicle as recited in claim 1, further comprising a vehicle battery, wherein the controller selectively directs power from the energy recovery mechanism to the vehicle battery until the vehicle battery is fully charged, and wherein the excess power from the energy recovery mechanism is power in excess of what is required to fully charge the vehicle battery.

8. The electrified vehicle as recited in claim 1, wherein the energy recovery mechanism is a regenerative braking system that selectively resists rotation of at least one wheel of the electrified vehicle.

9. The electrified vehicle as recited in claim 1, wherein the electrified vehicle is a hybrid electric vehicle.

10. A method of dissipating power within an electrified vehicle, comprising:
   generating excess power from an energy recovery mechanism of the electrified vehicle; and
   using a controller, simultaneously activating both a battery cooling mode and a battery heating mode to dissipate the excess power from the energy recovery mechanism.

11. The method as recited in claim 10, wherein the battery cooling mode and battery heating mode are simultaneously activated if the battery heating mode alone cannot dissipate the excess power.

12. The method as recited in claim 11, wherein the battery cooling mode and the battery heating mode are simultaneously activated only if a vehicle battery is below a threshold temperature.

13. The method as recited in claim 10, wherein activating the battery cooling mode includes directing excess power to at least one of a coolant pump and an air conditioning compressor.

14. The method as recited in claim 13, wherein activating the battery heating mode includes directing excess power to a heater adjacent a vehicle battery.

* * * * *